Aug. 10, 1937.  S. HAMAD  2,089,258
VEGETABLE SLICER
Filed Oct. 5, 1936  3 Sheets-Sheet 3
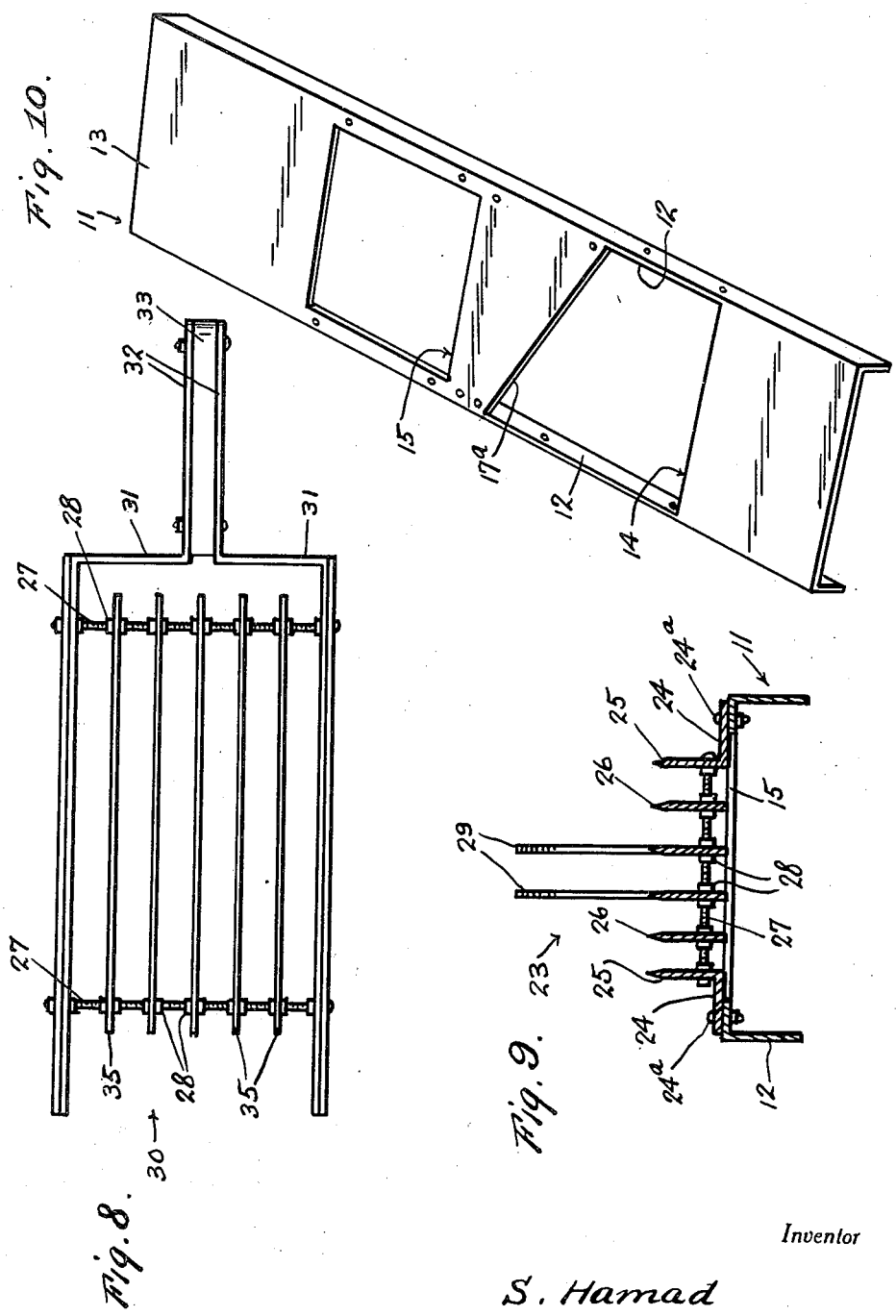
Inventor
S. Hamad
By Clarence A. O'Brien and
Hyman Berman, Attorneys Patented Aug. 10, 1937

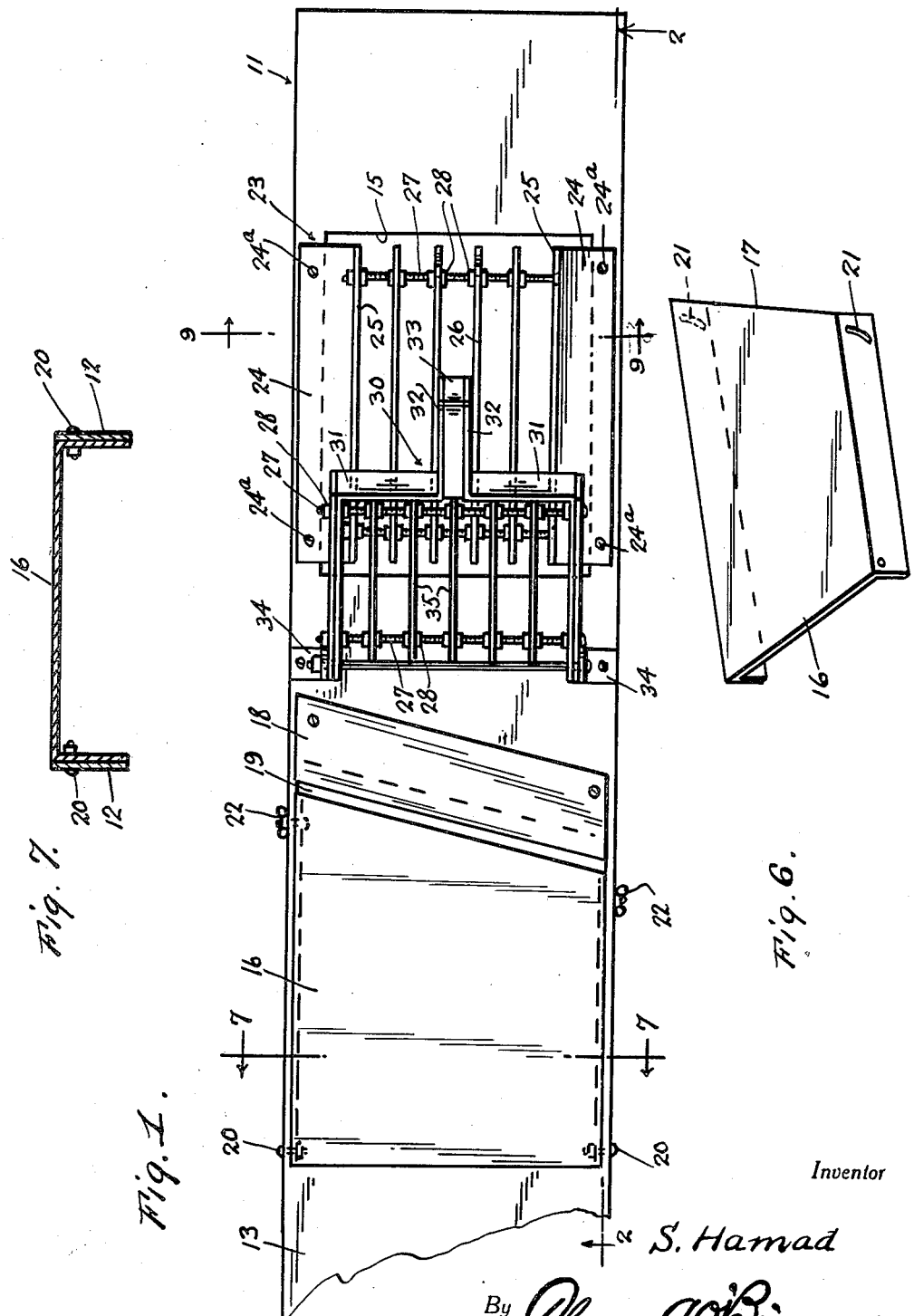

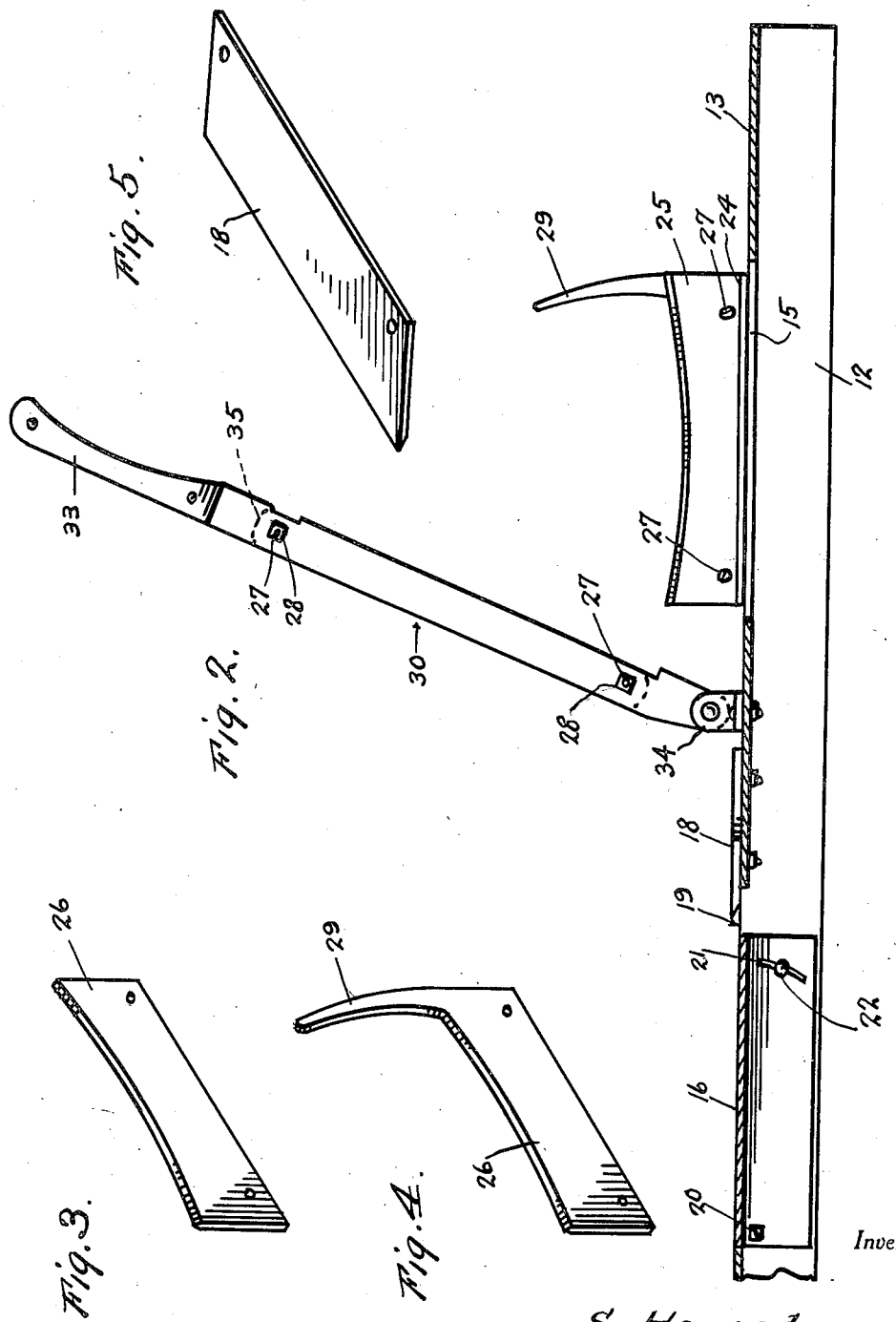

2,089,258

UNITED STATES PATENT OFFICE 2,089,258

VEGETABLE SLICER

Samuil Hamad, Cleveland, Ohio

Application October 5, 1936, Serial No. 104,105

2 Claims. (Cl. 146—169)

This invention relates to a structure which may be unitarily referred to as a vegetable slicer, the same being especially, but not necessarily adapted for slicing potatoes into sections or pieces to facilitate cooking and frying in accordance with present day fads.

Inasmuch as the art to which the invention pertains is reasonably well congested with various types and styles of vegetables and fruit cutters, it is evident that the present invention is also in the nature of a novel and improved device comparatively distinctive in that it is possessed of appreciable refinement and distinction believed sufficient to render it more appropriately and aptly fitted to serve desired purposes.

One feature of the invention is considered to reside in the adoption and use of a unitary metal base of general channel-shaped cross sectional form wherein the web portion thereof is apertured to accommodate selectively usable slicing or cutting units, the units being associated with the apertures to allow the severed pieces to drop into a collecting receptacle for convenient cooking.

A further improvement has to do with the adoption and use of a diagonally disposed fixedly mounted cutting blade on a supporting base associated with a tiltable and adjustable platform constituting a desirable platen on which the potato can be reciprocated toward and from the knife to convert it into relatively thin slices for frying so-called potato chips.

The chief novelty ostensibly resides in features of newness exhibited in complemental fixed and movable multiple bladed units assigned to the task of performing the chief slicing or cutting results.

Other features and advantages will become more readily apparent from the following description and the accompanying illustrated drawings.

In the drawings, wherein like numerals are employed to designate corresponding details throughout the various views:—

Figure 1 is a top plan view of the complete assembly embodying the selectively usable slicing or cutting means constructed in accordance with my invention.

Figure 2 is a longitudinal sectional view taken approximately on the plane of the line 2—2 of Figure 1.

Figures 3, 4 and 5 are perspective drawings of renewable cutting blades forming components parts of the general assembly.

Figure 6 is a perspective drawing of the oblique ended tiltable platform forming a part of the base.

Figure 7 is a cross section on the line 7—7 of Figure 1.

Figure 8 is a top plan view of the relatively swingable vegetable slicer unit.

Figure 9 is a cross section taken on the plane of the line 9—9 of Figure 1.

Figure 10 is a perspective showing of the unitary simplified base to accommodate and support the distinguishable cutter unit.

As a matter of convenience I call attention to Figure 10 which shows a master part of the general assembly hereinafter referred to as the base and denoted by the numeral 11. This comprises a unitary sheet metal member which may be defined as channel-shaped in cross sectional form and longitudinally elongated in top plan view. The spaced parallel side flanges 12 function to accommodate certain of the accessories and the web portion 13 has struck out therefrom two distinguishable openings 14 and 15, the opening 14 having a diagonal oblique edge at one end.

The hand adjustable tiltable platform unit which is also channel-shaped in cross section (see Figure 6) is denoted by the numeral 16 and is constructed to fit into the opening 14. The oblique or diagonal edge 17 corresponds to the identically cut edge 17a. Mounted for association with this edge 17a is a cutting blade 18 whose cutting edge is placed on the edge 17 to form a slot or throat 19 through which the slices of the potato (not shown) may drop into an underlying collecting pan or receptacle. The side flanges of the platform fit in between the adjacent flanges 12 of the base and are pivoted in place as indicated at 20. The segmental slot 21 serves to accommodate clamping bolt 22 provided with a wing nut whereby to provide an adjustable platform for the potato or other vegetable. The adjustable end of the platform is located in close spaced proximity to the cutting edge of the blade 18 so that the thickness of the slice may be regulated in a predetermined manner. By placing the potato on the platform and working it toward and from the knife 18, it is sliced or shaved into relatively thin pieces to make so-called potato chips.

Cooperating with the rectangular hole 15 is a relatively fixed multiple bladed slicing grid denoted unitarily by the numeral 23. As shown in Figures 1 and 9, this comprises a pair of duplicate outer angle members the horizontal flanges 24 of which are bolted or otherwise secured as at 25 to the base. The vertical flanges 25 have their upper ends sharpened to provide cutting knives or blades. The numerals 26 designate the companion supplementary parallel blades which are mounted between the blades 25 in an even plane. This is accomplished through the use of transverse longitudinally spaced screw threaded rods 27 removably bolted in the outermost blade 25. These various blades 26 are held in place and adjusted in relation to each other by paired retaining and adjusting nuts 28 on said threaded rods. It is as possible to use any number of blades and to adjust these into different spaced positions to accomplish the desired cutting results. All of the blades are located above the opening 15 so that the cut slices drop down through said opening into the accumulating pan or other receptacle (not shown). In order to hold the potato against longitudinal slippage in a direction from left to right in Figure 1, the central blade 26 is provided with upstanding retaining or holding fingers 29 of general arcuate form to provide for effective maintenance of the potato on the bladed grid 23 when it is first placed thereon for slicing. Incidentally the potato can be sliced longitudinally and then bodily turned around at right angles and sliced again in the later position or any intervening position as is obvious. I shall not, however, attempt to delve into this phase of the case for different users of the device will slice vegetables in variegated ways as is obvious.

Attention comes now to the relatively movable grid unit 30 which is cooperable with the companion fixed cutting or grid unit 23. This comprises a frame embodying a pair of substantially L-shaped members 31 having extensions 32 at one end attached to an inter-fitting block 33 and defining an appropriate operating lever or handle at one end of the frame. At the opposite end, that is, the elongated portion the L-members form the attaching and supporting arm and these are pivotally attached to brackets 34 on the web portion of the base 11. The location is such that the frame 30 swings toward and from the companion grid 23 in an obvious mutually cooperable manner. Both grids are therefore properly proportionate to provide the requisite matching and cutting results. The blades 35 in the frame are assembled in spaced parallel order and alternately arranged with respect to the blades 26 so as to swing therebetween as is evidenced. These blades 35 are also mounted on screw threaded rods 27 held in place by clamping nuts 28 in the same way as already explained in Figure 9.

By placing a potato on the grid 23 it is initially held in place by the guard fingers 29. By bringing the blades 35 of the movable grid unit or cutter 30 down against the grid 33 it is evident that the potato is sliced into sections or portions of a predetermined character. The initially sliced potato can be bodily shifted around on the grid to take the second or third cut as is evidenced until the piece is sufficiently small to drop down through the blades and the opening 15 into the underlying trapping pan or receptacle (not shown).

Manifestly, the parts constituting the complete assemblage have been carefully selected and mechanically coordinated to provide a structure aptly fitted to accomplish satisfactory results in a safe and dependable manner. The construction is simple and economical and especially desirable in that the blades are adjustable and replaceable, enabling the machine to be kept in good order for efficient operation.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having thus described the invention what is claimed is:

1. In a structure of the class described, a base including a plate having an opening, a multiple bladed grid cooperable with said opening and including a pair of angle members having their horizontal flanges attached to the base and their vertical flanges sharpened to provide upstanding cutting knives, forward and rear transverse screw threaded rods attached to said vertical flanges and a plurality of spaced parallel blades adjustably mounted on said rods and held in place by nuts and guard fingers connected with and rising from certain of said blades.

2. In a structure of the class described, a base member including a plate having a cuttings discharge opening, a multiple bladed grid unit cooperable with said opening and including a pair of angle members having their horizontal flanges attached to the base and their vertical flanges sharpened to provide upstanding cutting knives, forward and rear transversely arranged screwthreaded rods attached to said vertical flanges, a plurality of spaced parallel blades adjustably mounted on said rods and held in place by nuts, and guard fingers connected with and rising from certain of said blades, the aforementioned bladed grid being relatively rigid, and a relatively movable grid unit cooperable therewith, said movable grid unit including a frame having a handle at one end, said frame being provided with additional screw-threaded supporting rods, and blades disposed in spaced parallel order and adjustably mounted on the rods within the limits of said frame.

SAMUIL HAMAD.